United States Patent [19]

Bleiwas et al.

[11] Patent Number: 4,626,966
[45] Date of Patent: Dec. 2, 1986

[54] FLASHING STROBE BEACON

[76] Inventors: Martin Bleiwas, 1 Fox Ave, Baldwin, N.Y. 11510; Edmund Goldstein, 42 West Blvd., East Rockaway, N.Y. 11518

[21] Appl. No.: 777,690

[22] Filed: Sep. 19, 1985

[51] Int. Cl.⁴ .................. F21V 21/30; B61L 29/24; B60Q 1/26
[52] U.S. Cl. .................. 362/35; 340/50; 340/87; 340/77; 362/232; 362/237
[58] Field of Search .............. 340/50, 87, 77; 362/35, 362/232, 237, 246, 368

[56] References Cited

U.S. PATENT DOCUMENTS

| | | | |
|---|---|---|---|
| 1,834,041 | 12/1931 | Bartow | 362/35 |
| 2,041,412 | 5/1936 | Homrighous | 362/232 |
| 2,201,093 | 5/1940 | Illo | 362/232 X |
| 2,288,177 | 6/1942 | Bailey | 362/35 |
| 3,166,973 | 1/1965 | Healey | 362/35 X |
| 3,488,630 | 1/1970 | Decker et al. | 340/77 |
| 3,875,561 | 4/1975 | Scarpino et al. | 340/77 X |

Primary Examiner—Richard E. Gluck
Attorney, Agent, or Firm—Michael I. Kroll

[57] ABSTRACT

An improved flashing beacon strobe in which high intensity halogen gas filled gaseous discharge tubes are used as a light source. The gaseous tubes are strobed at a desired rate by a switched high voltage high current power source. Rotating cylindrical lenses with variously colored sections are placed coaxially upon each gaseous discharge tube. In one embodiment, two gaseous discharge tubes are each equipped with a rotating cylindrical lens and a V-shaped mirror is placed between the cylindrical lenses to prevent interference and increase dispersion. Dispersion is further enhanced by using fresnel type lens material. The cylindrical lenses are rotated synchronously, a system which includes an electrical motor, rotating pods and a timing chain which maintains a constant angular relationship between the cylindrical lenses.

4 Claims, 4 Drawing Figures

FLASHING STROBE BEACON

BACKGROUND OF THE INVENTION

1. Field of the Invention

The present invention relates generally to the field of illuminating devices and, more specifically to improvements of beacons which may typically be mounted upon emergency vehicles.

2. Description of the Prior Art

High intensity beacons are often used in order to unequivocably signal emergency situations. The most frequent use occurs when these beacons are mounted upon emergency vehicles such as police cars or ambulances. At the present state of the art, a number of companies such as Whelen Engineering Company, Inc. of Deep River, Connecticut produce high intensity beacons. The most frequently used type utilizes a high intensity sealed-beam lamp which rotates inside a dome. When a multicolored display is required each lamp is provided with a different colored lens which is normally integral to the lamp. When a multi-colored display is required several rotating lamps, each with different colored lenses must be used. A commutator or slip ring apparatus must also be used in order to connect the rotating lamps to a power source. This configuration requires a large power consumption since the peak output power, measured in lumens is equal to the average output power. Electrical commutating connections eventually wear or corrode and cause intermittent and unreliable connections. As bulbs require replacement, close attention must be paid to make certain that the replacement lamps are equipped with the correct colored lens.

SUMMARY OF THE INVENTION

It is, therefore, a primary object of the present invention is to provide an improved flashing strobe beacon which emits high intensity rotating multi-colored flashes of light.

A further object is to provide an improved flashing strobe beacon which is with a high energy efficiency. This is accomplished by using gaseous discharge tubes filled with a halogen gas such as xenon so that the peak light output for the flash duration is much greater than the average power consumption.

A still further object is to provide an improved flashing strobe beacon in which no commutator or slip ring apparatus is required. This is accomplished by fixing the position of the gaseous discharge tubes and employing a cylindrical rotating lens with the gaseous discharge tube placed coaxially within the cylindrical lens.

A yet further object is to provide an improved flashing strobe beacon in which more than one beacon may be operated simultaneously without interference yet with synchronicity.

A further object is to provide an improved flashing strobe beacon in which the color of the flash is determined by the coloration of the rotating lens, thereby obviating the need for specially colored lamps.

Another further object is to provide an improved flashing strobe beacon in which the flash repetition rate and the rate of color change are independently controlled.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
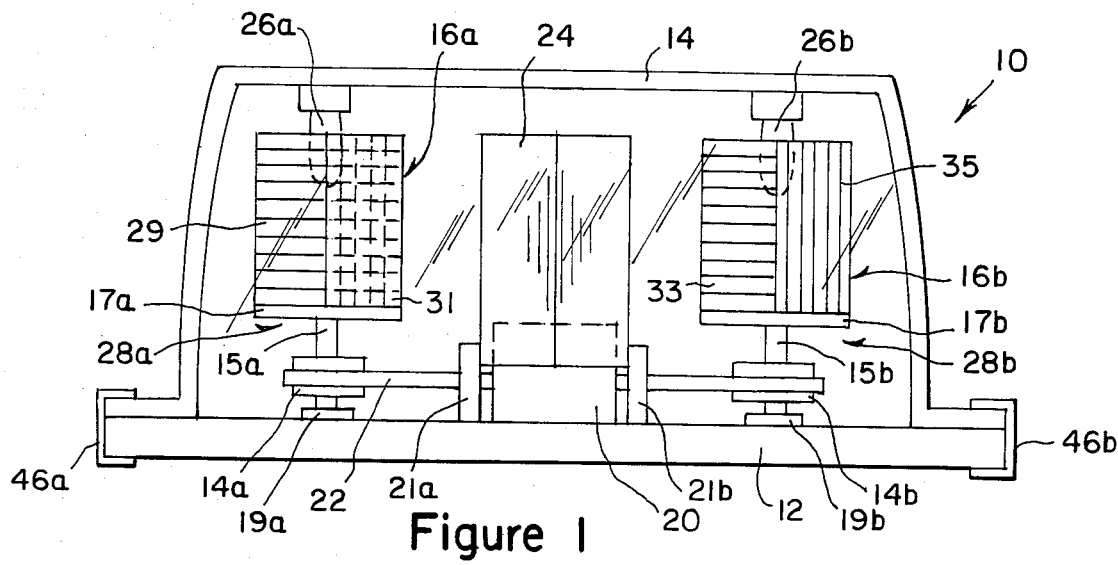
FIG. 1 is a front plan view of the invention.

The apparatus which comprises the invention 10 is shown mounted upon a sturdy rectangular base 12 typically made from cast aluminum. A motor 20, which is supported by motor mounts 21a and 21b, is used to drive timing chain 22 which engages pulleys 14a and 14b; which in turn cause shafts 15a and 15b respectively to rotate inside bearings 19a and 19b respectively; which in turn cause platforms 17a and 17b respectively to rotate. The combination of bearing 19a, pulley 14a, shaft 15a and platform 17a is herein referred to as left rotating pod 28a. Likewise, the combination of bearing 19b, pulley 14b, shaft 15b and platform 17b is herein referred to as right rotating pod 28b. The synchronicity of left rotating pod 28a and right rotating pod 28b is ensured either by the friction drive of pulleys 14a and 14b with drive timing chain 22. Alternatively, pulleys 14a and 14b may be provided with teeth which engage mating teeth in drive timing chain 22. Motor switch 42 turns motor 20 on and off by switching power supplied by typical battery 44. A variable motor speed controller may be inserted between motor switch 42 and motor 20 in order to control the rate at which colors change.

Two fixed high intensity gaseous halogen strobe lamps, left strobe lamp 26a and right strobe lamp 26b emit brief intense flashes of light when strobe switch 40 pulses high voltage- high current power from power supply 38. The repetition rate of pulsing strobe switch 40 may be made variable thereby allowing independent control of flash repetition rate and color change rate.

Light from left strobe lamp 26a and right strobe lamp 26b which is directed inwards along the axis connecting the strobe lamps is dispersed by V-mirror 24 which prevents interference between the light sources and increases the outward radiation of light.

Figure 2A:
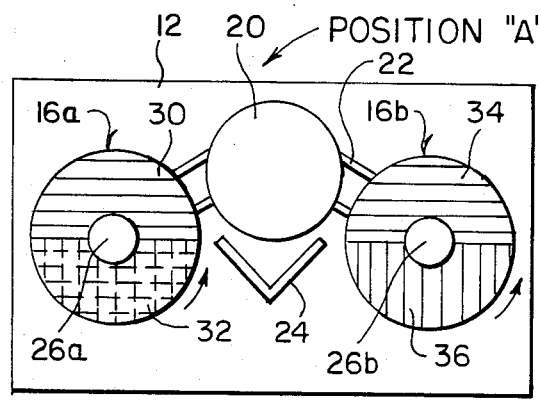
FIG. 2A is a top plan view of the invention shown with dome removed.
Figure 2B:
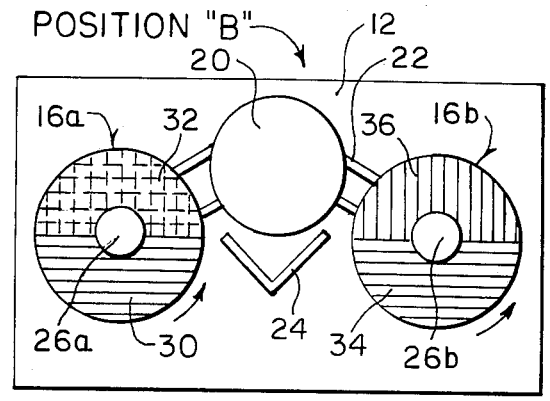
FIG. 2B is a top plan view of the invention shown with dome removed and both cylindrical lenses rotated 180° counterclockwise.
Figure 3:
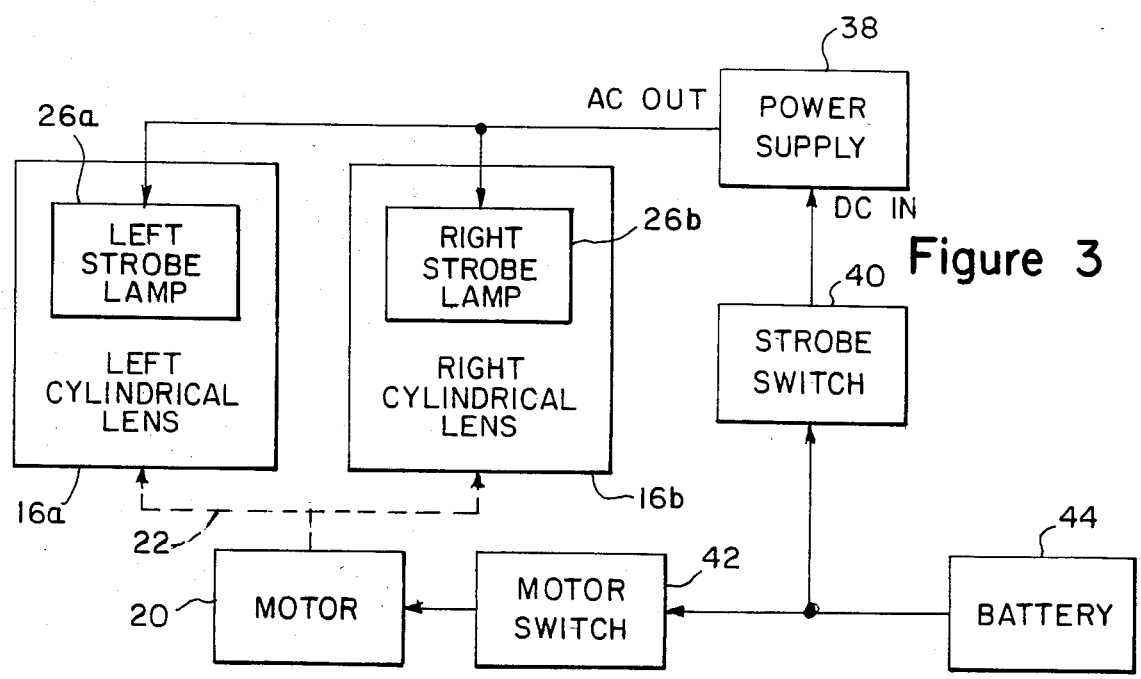
FIG. 3 is an electronic block diagram of the invention.

A left cylindrical lens 16a which is attached to left rotating pod 28a and a right cylindrical lens 16b which is attached to right rotating pod 28b have transparent outer cylindrical walls each of which are divided into hemi-cylindrical sections 29, 31, 33 and 35 which typically are variously colored. Cylindrical lenses 16a and 16b also have transparent top circular surfaces each of which are divided into semi-circular sections 30, 32, 34 and 36. In a typical application, semicircular section 30 is blue, section 32 is yellow, section 34 is blue and section 36 is red. The colors of hemicylindrical sections 29, 31, 33 and 35 would typically match semi-circular sections 30, 32, 34 and 36 with which they are vertically contiguous. Semicircular sections 30, 32, 34 and 36 are shown in initial position "A" in FIG. 2A and are shown rotated 180° counterclockwise in position "B" in FIG. 2B. Fresnel*type lens material is used to increase the light dispersion from cylindrical lenses 16a and 16b.

\* Fresnal type lens material is a series of concentric grooves on a flat, thin piece of plastic and each groove acts as a minute refracting facet capable of bending light, thus giving greated transmission of light.

The invention 10 is protected by a dome 14 which serves to protect all internal components and is typically molded from a clear acrylic. Dome 14 is secured in a watertight manner to base 12 by end caps 46a and 46b.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An improved flashing strobe beacon, as the type in which a fixed mounted high intensity light source emits light through a circumferential rotating lens, wherein the improvement comprises:
    (a) a base made of a rigid material;
    (b) at least one gaseous discharge high intensity strobe lamp connected to said base;
    (c) two cylindrical lens through which coaxially mounted said gaseous discharge high intensity strobe lamp is mounted; whereby light emitted by said gaseous discharge high intensity strobe lamp must exit; and, wherein the outer cylindrical surface and the top circular surface of said cylindrical lens are comprised of at least two sections of variously colored fresnel light dispersing materials wherein said circular top surface is defined by two radii and said outer cylindrical surface is defined by downward projections of said radii, said two cylindrical lenses each containing one of said coaxially mounted gaseous discharge high intensity strobe lamps separated by a V-mirror such that light radiated along an axis connecting said cylinders is reflected perpendicularly to said axis, thereby further dispersing said light and preventing mixing of light from both of said cylindrical lenses.

2. An improved flashing strobe beacon, as recited in claim 1, wherein said means for rotating said cylindrical lens comprises a motor whose rotor lies in a plane perpendicular to said base and a shaft; a pulley attached to the end of said shaft; a rotating pod under each of said two cylindrical lenses; and, a timing chain connecting said pulley to each of said two cylindrical lenses.

3. An improved flashing strobe beacon, as recited in claim 2, wherein each of said rotating pods comprises a vertical pivoted shaft with axially mounted pulley and an axially mounted circular platform on top of which said cylindrical lenses are mounted.

4. An improved flashing beacon strobe, as recited in claims 2 or 3 wherein said pulley attached to said shaft on said motor and said pulleys attached to said shaft on said pods and said timing chain have teeth which fixes the relative rotation of said motor shaft and said cylindrical lenses so that said cylindrical lenses rotate in unison.

* * * * *